United States Patent Office 2,849,789
Patented Sept. 2, 1958

2,849,789

SINTERED POWDERED COPPER BASE METAL AND BEARING FORMED THEREOF

Robert F. Thomson, Grosse Pointe Woods, Mich., assignor to General Motors Corporation, Detroit, Mich., a corporation of Delaware No Drawing. Application December 11, 1953
Serial No. 397,789

8 Claims. (Cl. 29—182)

This invention relates to sintered powdered metal bearings having a high degree of wear resistance with or without subsequent cold or hot working or thermal treatment. More particularly, the invention pertains to sintered powdered copper base bearing parts containing tin, nickel and dispersed hard particles of nickel-titanium alloy.

Porous metal bearings commonly have been employed in industry during recent years, but their use in many applications has been limited because of their relatively low wear resistance. Sintered powdered metals having improved wear resistance are disclosed in co-pending patent application Serial Number 317,361, entitled "Highly Wear-Resistant Powdered Metals," which was filed October 28, 1952 in the name of Alfred L. Boegehold. The present invention constitutes an improvement over the bearing materials described in that application.

A principal object of this invention, therefore, is to provide a novel sintered powdered copper base bearing having a high degree of wear resistance due to the presence of nickel-titanium alloy particles. A further object of the present invention is to provide a simple, inexpensive process for forming a sintered powdered copper base bearing of such a composition having close dimensional tolerances.

These and other objects are attained in accordance with my invention by the addition of a powdered alloy of nickel and titanium to copper base metal powder. Small proportions of tin and nickel powders are also preferably included in the powdered metal mix and serve to provide the material with greater corrosion resistance, ability to age harden, wear resistance and strength. The formed bearing part, when sintered, or when sintered and worked to a controlled degree of porosity, possesses excellent wear resistance properties due to the presence of dispersed hard nickel-titanium particles. Such particles are introduced in the form of a pulverized intermediate alloy, as will be hereinafter more fully explained. The resultant wear-resistant sintered powdered copper base metal may be advantageously used to form piston pin bushings, camshaft bushings, balancer shaft bushings, and other bearing parts.

Sintered copper base bearings formed in accordance with the persent invention possess not only the aforementioned high wear resistance but also desirable oil-retaining porperties. Moreover, sintered powdered copper base bearings formed in accordance with my invention, when compared with similar parts made by normal manufacturing methods, do not require the expensive machining operations otherwise frequently necessary to provide the proper tolerances. In turn, since little or no machining is necessary, scrap or waste is reduced to a minimum. Other objects and advantages will more fully appear from the following detailed description of preferred embodiments of my invention.

The bearing part is initially formed by thoroughly mixing a finely pulverized alloy of nickel-titanium with a copper base powder containing nickel and/or tin. The latter constituents may be alloyed with the copper, although normally they are separately added to the mix in powdered form. Even relatively minute quantities of the nickel-titanium alloy powder improve wear resistance to a measurable extent; and the ranges of this constituent may vary from small but effective amounts to quantities constituting approximately 50% by weight of the final mix. However, in order to provide the desired economy and strength, particularly impact strength and shock resistance, the nickel-titanium content normally should be maintained between 0.5% and 15% by weight, although these properties are present to a satisfactory extent when the nickel-titanium constitutes about 20% of the powdered metal mix. Optimum properties are usually obtained when approximately 2% to 8% of the pulverized alloy of nickel and titanium is employed, however.

Finely divided graphite, preferably 80 mesh or finer, may be mixed with the metal powder to increase tool or die life and to improve frictional characteristics of the formed copper base bearing part. Small amounts of graphite not in excess of approximately 6.5% are satisfactory, while a graphite content between about 0.3% and 4% is normally preferred.

Likewise, in order to eliminate the necessity of coating the dies with a lubricant during the briquetting operation, a small but effective amount of zinc stearate powder not in excess of about 2.5% should also be included in the powdered metal mix. In general, I have found that best results are obtained with a mix having a zinc stearate content between approximately 0.3% and 2%. Other die lubricants, such as stearic acid in powder form, can also be used in place of the zinc stearate.

The inclusion of proper amounts of tin and nickel in the powdered metal mix further increases the wear resistance and score resistance of the formed bearing part. Moreover, nickel also contributes corrosion resistance to the bearing and improves its ability to age harden. Tin melts at a low temperature and alloys with copper to form a tin-copper alloy, the latter coating the substantially pure copper particles. During the sintering operation, the elevated temperature causes the tin to diffuse through the copper. The melting point of the metal is thus raised in the tin-rich areas, thereby providing a generally uniform alloy having a melting point above the sintering temperature. Since the tin brazes the copper particles together to form a bronze, the resultant metal is a better bearing material than if no tin were present and possesses better corrosion resistance. Furthermore, the tin and additional separately added nickel serve to strengthen the bearing.

Although amounts of tin as high as 18% by weight may be used, optimum results are obtained with a preferred tin content between approximately 1% and 13%. The addition of tin in quantities greater than 18% results in the formation of hard and brittle copper-tin compounds, which tend to produce galling. Alternatively, a bronze powder of similar composition may be employed.

Likewise, the preferred nickel range is between 2% and 15%, although this element may be substituted for copper in amounts ranging from a small but effective amount up to the point where the copper content is only slightly higher than the nickel content. In no instance, therefore, would the added nickel content exceed about 49% in this copper base bearing material. In view of the above considerations, I have found that a sintered powdered bearing having excellent wear and score resistance is one which comprises approximately 2% to 8% of nickel-titanium alloy, 0.3% to 4% carbon, tin not in excess of 13%, nickel not in excess of 15%, and the balance substantially all powdered copper.

I have obtained best results when the copper constitutes between about 70% and 97% of the total mix. However, it will be understood that the terms "copper base metal," "copper base bearing," and "copper base alloy," as used herein, are intended to encompass alloys of copper in which copper is the major constituent in the powdered metal mixture and preferably constitutes at least 50% of such a mixture.

The tin powder may be added in the form of tin dust, while the nickel may be introduced as nickel powder, such as electrolytic nickel powder or nickel produced from nickel carbonyl by means of the Mond process or other suitable means. Although nickel may also be used in other forms, it is desirable to add it in the form of nickel powder formed from nickel carbonyl as its commercially available fine particle size permits quicker homogenization. Electrolytic nickel powder, as commercially supplied, is somewhat coarser grained and its use requires a longer period of time at an elevated temperature to sufficiently homogenize the powder metal mix.

Among the pulverized nickel-titanium intermediate alloys which may be used, those containing approximately 15% to 65% titanium and 35% to 85% nickel have resulted in the production of a sintered powdered copper base bearing having satisfactory wear resistance. For best results, however, a powdered pre-alloy comprising between 50% and 75% nickel and 25% to 50% titanium is preferred.

I have found that the intermediate alloy of nickel and titanium may be formed by preparing a charge of the desired percentages of titanium sponge and electrolytic nickel. Small amounts of aluminum, iron, silicon, manganese, and chromium may be alloyed with the nickel-titanium, the resultant intermediate alloy then being pulverized and added to the powdered copper base metal mix. However, the silicon normally should not be present in the nickel-titanium alloy in amounts greater than approximately 3% by weight. The addition of aluminum appears to result in optimum properties of wear and score resistance if present in quantities ranging in general from about 0.3% to 15% of the pre-alloy, a 5% to 12% addition being preferred in many instances. Thus, a mixture of 41% titanium sponge, 44% electrolytic nickel, 1% silicon, 11.5% aluminum and up to 3% iron produces a satisfactory nickel-titanium alloy. When converted to percentages of the final sintered copper base bearing alloy, the above minor constituents therefore contribute approximately 0.0015% to 2.25% aluminum and iron and silicon not in excess of about 0.45% each.

The nickel and iron are preferably placed in a magnesia crucible and covered. Inasmuch as titanium is a readily oxidizable element, it is desirable to use a non-oxidizing gas, such as argon, as the melting atmosphere. The silicon, titanium and aluminum may then be successively added. A pouring temperature of approximately 3100° F. has proved to be satisfactory, the metal preferably being cast under the inert atmosphere as a pig in a chilled mold. Intermetallic compounds of nickel-titanium, such as $Ni_3Ti$, $NiTi_2$ and $NiTi$, are thus formed and, when pulverized and added to the copper base powder, greatly improve the wear resistance of the final sintered bearing. I have also found that the resultant compounds, solid solutions and combinations thereof form hard particles irrespective of the precise relative proportions of nickel and titanium used. Regardless of the exact form in which the hard particles of nickel-titanium are present in the powdered metal, their presence greatly improves the wear and score resistance of the sintered powdered copper base bearing.

Commercially pure copper, tin and nickel may be used or, as hereinbefore explained, a bronze powder of appropriate composition may be used in place of the mixture of copper and tin. Hydrogen reduced copper of approximately 150 mesh has provided excellent results, although the particle size of the copper may vary from about 80 to 250 mesh and still produce a satisfactory bearing. Approximately 200 to 400 mesh nickel-titanium powder is conveniently and preferably employed. Nickel-titanium particles which are too coarse are somewhat prone to cause scoring.

The sintered powdered copper base bearing may be formed by first briquetting a mixture of the pulverized nickel-titanium alloy, tin, nickel and copper, together with zinc stearate and graphite powder, if it is desired to add the latter constituents, at appropriate pressure in a die having a contour which is complementary to the bearing surface to be formed. Although a briquetting pressure between approximately 20,000 and 120,000 pounds per square inch has proved to be satisfactory, 40,000 to 60,000 pounds per square inch appears to be the optimum pressure range for most applications. Before briquetting, it is important that the powdered metal constituents be thoroughly mixed in order to provide uniformity of structure and properties to the resultant bearing.

The green briquette is then sintered under suitable conditions of time, temperature and atmosphere into a structure having a controlled degree of porosity. Sintering temperatures between 1300° F. and 1950° F. and sintering times between fifteen and thirty minutes have proved to be highly satisfactory for these powdered copper base briquettes. Excellent results have been obtained by sintering such a briquette at approximately 1500° F. for twenty minutes under a non-oxidizing furnace atmosphere, such as dry "Drycolene" gas. The above sintering times are not critical, however, and sintering times as short as four minutes and as long as two hours have produced satisfactory wear test results.

It is convenient to prepare "Drycolene" by burning one part of natural gas with approximately ten parts of air, condensing the water vapors, passing the gas through hot charcoal and drying it in activated alumina. The dry Drycolene gas thus is composed of approximately 20% carbon monoxide, 3% hydrogen and 77% nitrogen. Of course, other furnace atmospheres, such as hydrogen, mixtures of nitrogen and hydrogen or methane, etc., can be used, but Drycolene provides a highly effective protective atmosphere.

If an appreciable amount of nickel has been separately included in the powder metal mix, heat treatment subsequent to sintering is beneficial. Thus a solution treatment for one to eight hours in a non-oxidizing atmosphere at a temperature between approximately 600° F. and 1400° F. may be used to provide greater hardness and homogeneity. A two-step process is preferably employed, however, such as an initial heat treatment for five hours in a non-oxidizing atmosphere at 1400° F. followed by a water or oil quench and a low-temperature heat treatment or aging in a similar atmosphere for five hours at 600° F. The bearing may also be beneficially aged at room temperature following the solution step.

It will be understood that the sintered powdered copper base bearing containing hard particles of nickel-titanium may be manufactured under the usual porous metal techniques as disclosed in a number of patents, such as Patents Nos. 7,738,163, 2,097,671, 2,075,444, etc. Also, instead of briquetting the metal powder as hereinbefore explained, it may be molded to shape prior to sintering as suggested in Koehring Patent No. 2,198,702.

Likewise, the powdered metal mix may be merely spread on or otherwise placed in contact with a supporting surface and subsequently sintered. This supporting surface may be a non-porous metal backing strip, such as a steel strip, and the powdered metal may be bonded to the back on sintering. When this latter procedure is used, it may be desirable to first electrodeposit a suitable metal plate on the surface of the back to improve the strength of the bond. This type of process is disclosed in Koehring Patents Nos. 2,187,086 and 2,198,253. After sintering, the composite of spongy copper base alloy on the back may be rolled to increase the density of the powdered metal bearing and then resintered or annealed.

Additional rolling and annealing treatments can be employed to further increase the density of the bearing. In this manner a highly wear-resistant sintered bronze bearing layer, for example, may be formed on a steel back.

All of the above modifications are understood to be within the scope of the present invention, which broadly comprehends the provision of a sintered powdered copper-base bearing part containing tin and/or nickel and hard particles of a nickel-titanium alloy.

Wear and score test apparatus were employed to compare sintered copper-base metal samples formed in accordance with my invention with sintered copper-base samples containing no nickel-titanium particles. These samples were prepared as tensile bars briquetted at a pressure of 60,000 pounds per square inch. They were then sintered for 25 minutes in a dried Drycolene atmosphere at a temperature of 1525° F. and subsequently cooled in this atmosphere. None of the samples were forged. Each specimen to be tested was machined to prepare a ⅛ inch by 1⅛ inch rubbing surface. The specimens were next successively locked in a fixture of the wear test machine and placed in contact with a rotating smooth-surfaced cast iron wheel having a face width of one inch. A modified wear test using this apparatus was then conducted in which the specimen load was increased to 512 pounds and retained at this figure for a total test period of five hours. At the end of this time the sintered copper base test specimens which did not contain nickel-titanium particles showed an average weight loss of 0.341 gram, while the copper base samples containing the hard nickel-titanium particles lost an average of only 0.005 gram. Similarly, while the former specimens underwent a volume loss averaging $269 \times 10^{-5}$ cubic inches, the test specimens formed in accordance with the present invention changed on the average only approximately $5 \times 10^{-5}$ cubic inches. The results of these tests, which show the relatively low weight and low volume changes of my new sintered powdered copper-base bearing material under severe wear test conditions, illustrate its high wear resistance.

When these various specimens were also subjected to a score test and compared, sintered powdered copper-base samples containing nickel-titanium particles showed greater score resistance than the specimens which did not. In this score test, the test samples were placed against the aforementioned rotating wheel for 60 minutes under a 502 pound specimen load, and this load was then increased until scoring occurred.

While the present invention has been described by means of certain specific examples, it is to be understood that the scope of the invention is not to be limited thereby except as defined in the following claims.

I claim:

1. A highly wear-resistant sintered copper base bearing formed from a powder metal mixture consisting essentially of tin, nickel, dispersed hard particles of nickel-titanium alloy of which the nickel and titanium constitute about 35% to 85% and 15% to 65%, respectively, and the balance substantially all a metal powder selected from the class consisting of copper and copper base alloys, said hard particles of nickel-titanium alloy being present in a quantity ranging from approximately 0.5% to 50%.

2. A sintered powdered copper base metal comprising approximately 0.5% to 20% of a nickel-titanium alloy of which the nickel and titanium constitute about 35% to 85% and 15% to 65%, respectively, approximately 2% to 15% nickel, and the balance substantially all at least one metal selected from a class consisting of copper and copper base alloys.

3. A highly wear-resistant sintered powdered metal bearing formed from a mixture consisting essentially of 0.5% to 20% nickel-titanium alloy powder of which the nickel and titanium constitute 35% to 85% and 15% to 65%, respectively, 2% to 15% nickel powder, 0.3% to 6.5% carbon, and the balance substantially all powdered bronze.

4. A highly wear-resistant sintered powdered metal consisting essentially of approximately 0.5% to 20% of an intermediate alloy of nickel and titanium, about 0.3% to 6.5% carbon, approximately 1% to 18% tin, and the balance substantially all at least one metal selected from the class consisting of copper and copper base alloys said intermediate alloy comprising 50% to 75% nickel and 25% to 50% titanium.

5. A highly wear-resistant sintered powdered metal consisting essentially of about 0.5% to 15% of an intermediate alloy of nickel and titanium in the form of dispersed hard particles, 1% to 18% tin, 2% to 15% nickel, and the balance substantially all copper said hard particles containing about 50% to 75% nickel and 25% to 50% titanium.

6. A sintered powdered metal bearing characterized by high wear and score resistance, said bearing being formed from a powdered metal mixture consisting essentially of 2% to 8% dispersed hard particles of nickel-titanium alloy, 1% to 13% tin, 2% to 15% nickel, and the balance substantially all copper said nickel-titanium alloy consisting principally of 35% to 85% nickel and 15% to 65% titanium.

7. A sintered bearing characterized by oil-retaining properties, high wear resistance and anti-score properties, said bearing formed from a powdered metal mixture consisting essentially of 1% to 13% tin powder, 2% to 15% nickel powder, 2% to 8% pulverized nickel-titanium alloy, 0.3% to 4% carbon, 0.3% to 2% die lubricant, and the balance substantially all copper, said nickel-titanium alloy comprising 50% to 75% nickel and 25% to 50% titanium.

8. A wear-resistant porous metal bearing formed from a sintered powdered mixture consisting essentially of about 0.5% to 15% of dispersed hard particles of nickel-titanium alloy of which nickel and titanium respectively constitute approximately 35% to 85% and 15% to 65%, 1% to 13% tin, and the balance substantially all copper.

References Cited in the file of this patent

UNITED STATES PATENTS

| | | |
|---|---|---|
| 1,974,173 | Calkins | Sept. 18, 1934 |
| 2,102,238 | Pilling | Dec. 14, 1937 |
| 2,289,569 | Boegehold | July 14, 1942 |
| 2,372,202 | Hensel et al. | Mar. 27, 1945 |
| 2,694,790 | Studders | Nov. 16, 1954 |

FOREIGN PATENTS

| | | |
|---|---|---|
| 560,483 | Great Britain | Apr. 5, 1944 |